July 23, 1968 S. B. COVERT, JR 3,393,795
DISPENSING CONTAINER
Filed Dec. 12, 1966 4 Sheets-Sheet 1

INVENTOR
STANLEY B. COVERT, JR.
BY Harris M. Isaacson
ATTORNEY

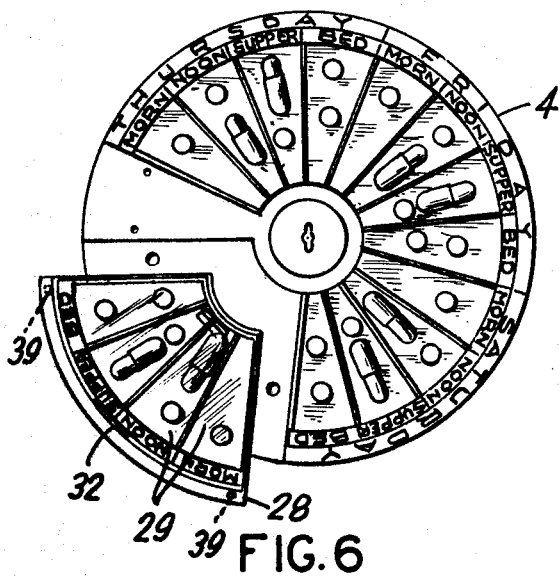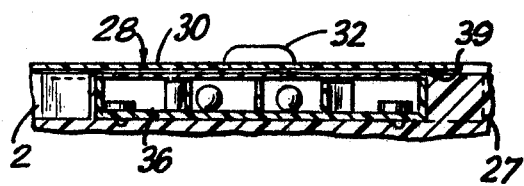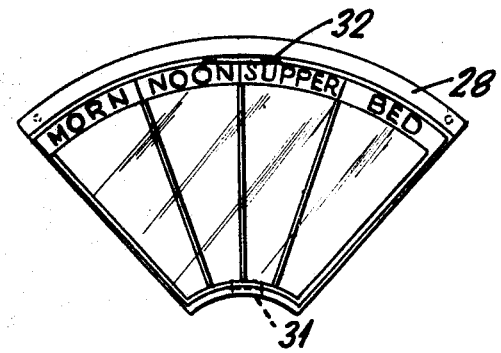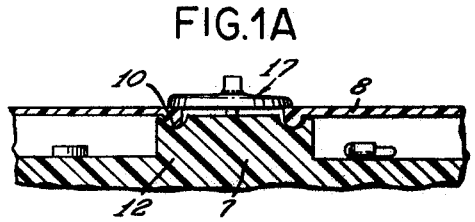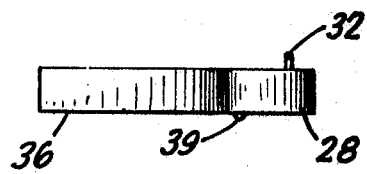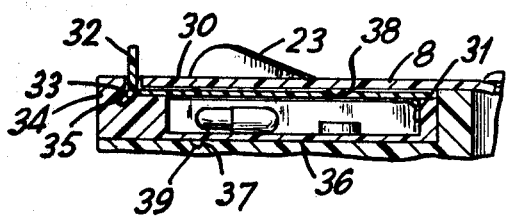

July 23, 1968     S. B. COVERT, JR     3,393,795
DISPENSING CONTAINER
Filed Dec. 12, 1966                              4 Sheets-Sheet 4
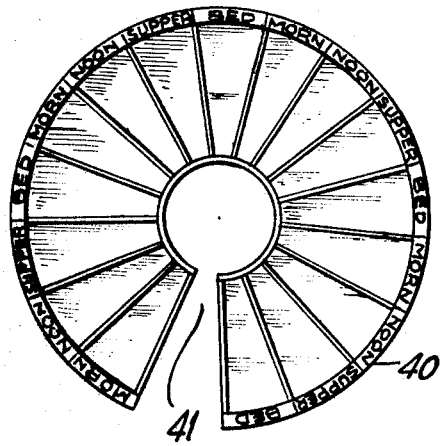
FIG. 10
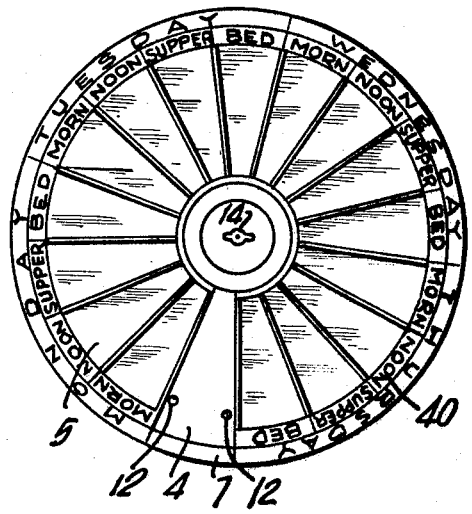
FIG. 11
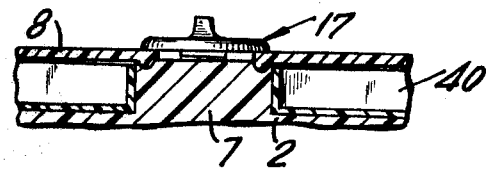
FIG. 12
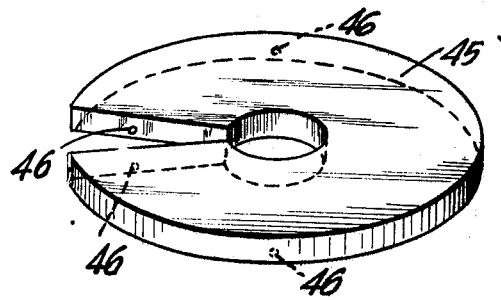
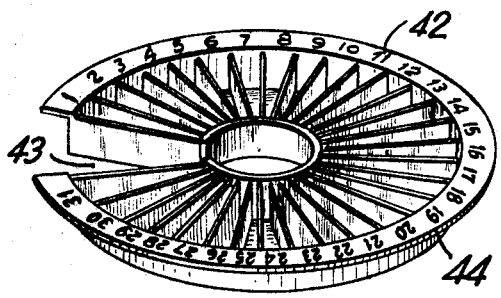
FIG. 13
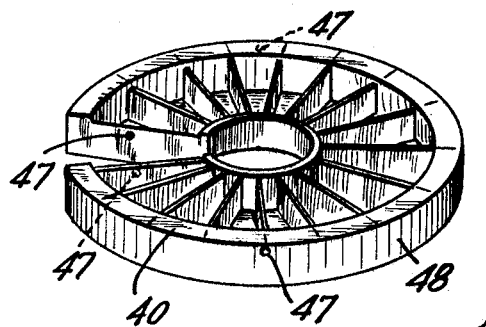
FIG. 14
INVENTOR
STANLEY B. COVERT, JR.
BY
ATTORNEY

United States Patent Office 3,393,795
Patented July 23, 1968

3,393,795
DISPENSING CONTAINER
Stanley B. Covert, Jr., Kingfield, Maine
(4th and Laurel, Shelton, Wash. 98584)
Filed Dec. 12, 1966, Ser. No. 600,924
21 Claims. (Cl. 206—42)

ABSTRACT OF THE DISCLOSURE

A dispensing container having body portion segmented into substantially equal compartments, at least one of the compartment areas slightly larger than the remaining areas, the larger area having a substantially flat top surface; a cover for the container having an opening similar in shape to the shape of each of the compartments, the cover including positive locking means thereon which intersect a portion of the compartments to maintain the position of the cover opening as it is sequentially positioned over selected compartments, the cover opening adapted to be positioned in locked position over the larger flat surfaced area to maintain the container in closed condition. The dispenser may be further provided with a removeable packet segmentable from the dispenser as a separate supplemental container leaving the dispensing container as a separate functioning unit. The compartmentalization may be provided by use of at least one removeable tray insertable and removeable from the container body and maintained within the container body by the cover.

---

The present invention relates to a dispensing container for medicaments such as pills, tablets, capsules or the like.

Present day practices of prescribing medication in varying dosages to be taken over varying intervals have presented problems with regard to proper scheduling. This is especially true in view of the fact that the recipient of the medication is many times, due to his infirmity unable to readily schedule his dosages. The elderly, forgetful, confused or those who comprehend poorly likewise can find difficulty in following a systematic regimen.

In an attempt to overcome this problem numerous devices have been developed to store and dispense medication. The most basic of these were simple medicine boxes wherein the pills or capsules could be stored. In more sophisticated devices the dispensing of pills, one at a time or in combinations, was provided for. While this was of some aid, no provision was made to segregate the medication either by dosage or time interval.

Segmented compartment containers were developed however, in order to properly provide for dosages, relatively complicated dispensing mechanisms had to be employed and the devices themselves became relatively difficult to fill and/or use thereby defeating the main purpose of the dispenser.

In order to provide a completely acceptable dispenser, the dispenser must be simple to operate, designed to meet the needs of complicated medication schedules, provide orientation for a wide variety of dispensing periods, be simply loaded and unloaded, provide an area for identification, be readily cleanable and be economic, even to the point of being disposeable.

Certain devices of the past were designed to meet some of the aforementioned requisites however, none have solved the same.

According to the present invention, a pill dispenser compartmentalized into specified periods is provided, the dispenser having an upper and lower portion each adapted to act as storage and dispensing trays, both portions provided with a moveable cover thereon, the contents of the trays being exposed and removeable for use through an opening in the cover.

The dispenser of the present invention is further adapted to removeable compartments able to serve as individual shorter time period dispensers or interchangeable within the main dispenser so that the same may be filled for example by a druggist in conformity with a prescription for ready insertion into the dispensing device.

The device of the present invention provides simple positive locking means to prevent loss or confusion of the contents. The dispenser itself is aesthetically pleasant resembling a woman's compact or man's tobacco tin.

The dispenser is so constructed as to provide a surface readily useable for identification purposes which may if desired contain specialized identification matter such as by provision of braille symbols.

Although such novel feature or features believed to be characteristic of the invention are pointed out in the claims, the invention and the manner in which it may be carried out may be further understood by reference to the description following and the accompanying drawings.

FIG. 1A is a sectional view of the present invention in closed locked position.

FIG. 6 is a bottom plan view of another embodiment of the present invention with the cover removed.

FIG. 7 is a detail front elevation partly broken away view of FIG. 6.

FIG. 8 is a plan view of a supplemental insert of the present invention.

FIG. 9 is a side elevation of FIG. 8.

FIG. 9a is a detailed section of the supplemental insert of the present invention in the compartment body of the present invention.

FIG. 10 is a top plan view of another tray embodiment of the present invention.

FIG. 11 is a top plan view of the tray of FIG. 11 in the compartment body of the present invention with the cover removed.

FIG. 12 is a detailed section of the tray of FIG. 11 in the compartment body of the present invention.

FIG. 13 is a perspective view of another tray of the present invention.

FIG. 14 is an exploded view of a tray and storage cover of the present invention.

Figure 1:
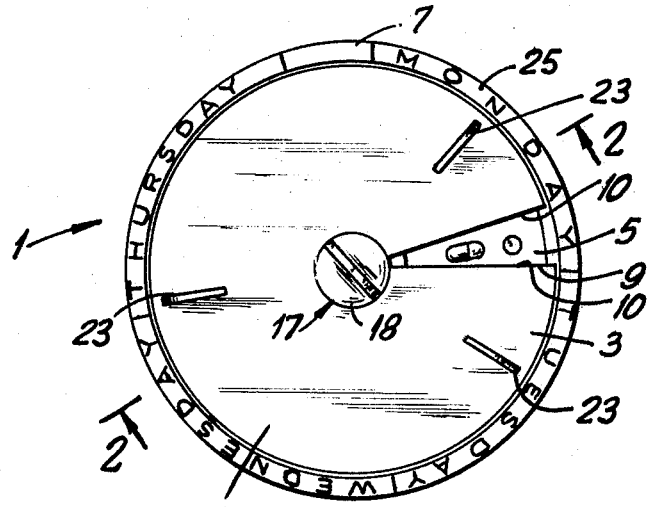
FIG. 1 is a top plan view of the present invention.

The dispensing container 1 of the present invention is of a substantially circular circumferential shape having substantially flat top and bottom surfaces. The compartment body 2 has a top tray 3 and bottom tray 4 therein. Each tray 3, 4 is compartmentalized into substantially triangular compartments 5, the apex of each compartment 5 pointing inward towards the central portion of the dispensing container 1.

Figure 2:
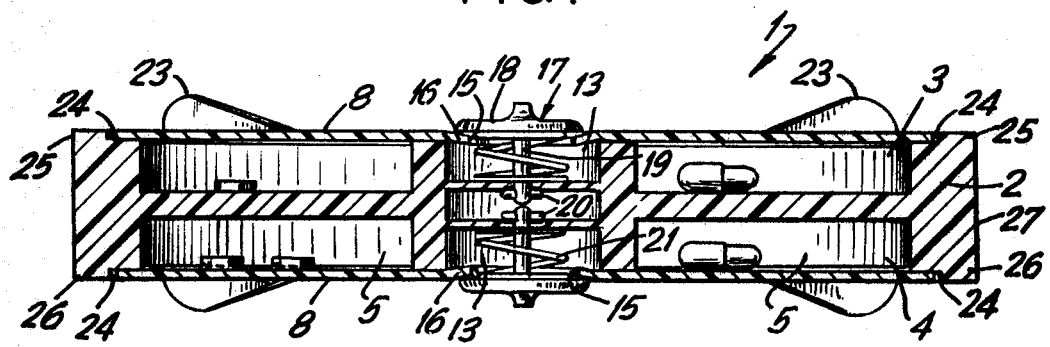
FIG. 2 is a front view of a section of FIG. 1 along lines 2—2.
Figure 3:
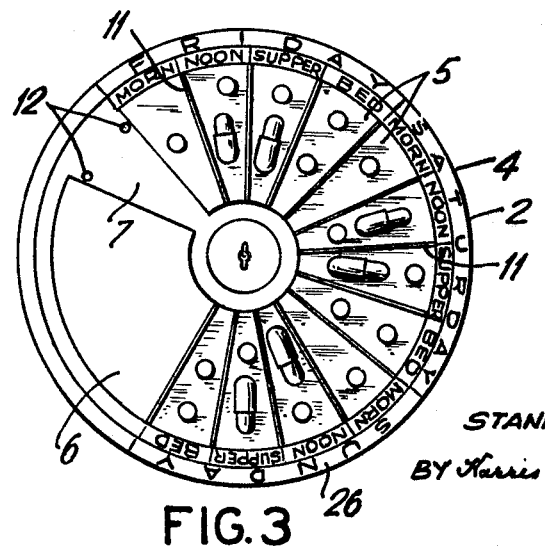
FIG. 3 is a bottom plan view of the bottom portion of FIG. 1 with the cover removed.
Figure 4:
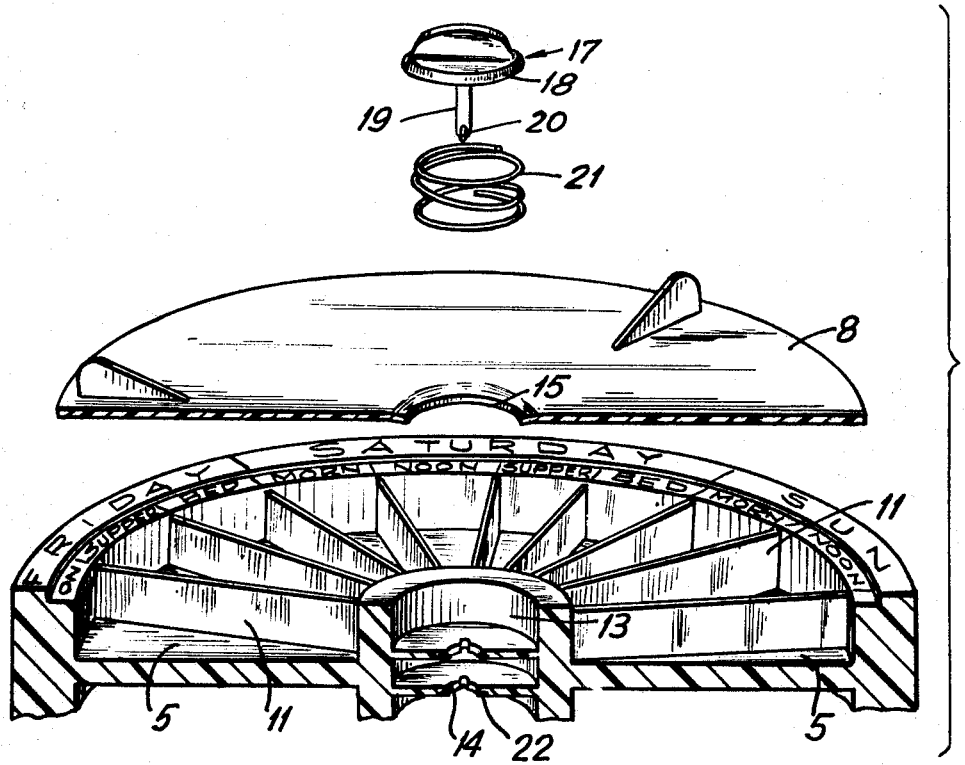
FIG. 4 is a partially exploded view of the cover affixation means of the present invention.
Figure 5:
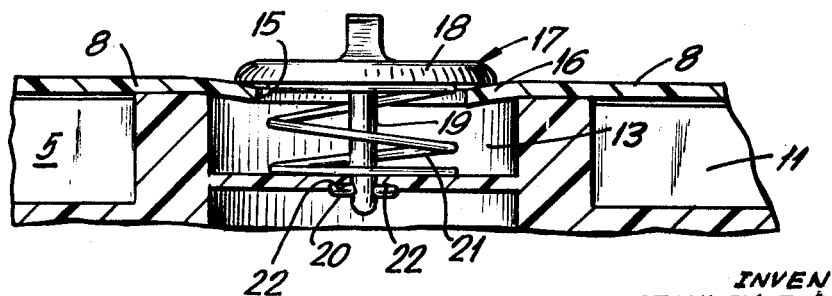
FIG. 5 is a sectional detail of the cover lock in fixed position.

As shown in FIGS. 1–6, the subdivision in each tray 3, 4 has been made to illustrate the four waking time periods of the day; morning, noon, supper and bed time. All seven days of the week are provided with the four major compartments 5, Monday through Thursday on top tray 3 (FIG. 1) and Friday through Sunday on the bottom tray 4 (FIG. 3). Each compartment 5 is preferably of equal size which will provide a blank area 6 on the bottom tray 4 for storage purposes or for use of a separate packet as hereinafter described.

It is readily apparent that the subdivision of the trays 3, 4 is flexible and a greater or lesser number of compartments 5 can be provided for specific needs.

A solid portion 7 is provided on both the upper and lower portions of the compartment body 2, each solid portion 7 being slightly wider than but of substantially the same configuration as a compartment 5.

A cover 8 is provided to fit over top and bottom trays 3, 4 the cover 8 having a cut-out area 9, the cut-out area 9 of slightly narrower, but of substantially the same configuration as a compartment 5. The underside of each cover 8 may be provided with a pair of depending flanges 10 shown in phantom in FIG. 1, depending flanges 10 being along the edge of cut-out area 9 so that when cut-out area 9 is positioned substantially over a compartment 5 the depending flanges 10 will abut the side walls 11 of compartment 5 maintaining cover 8 in fixed position with respect to compartment 5.

As shown in FIG. 1A, solid portion 7 may be provided with declivities 12 adapted to receive depending flanges 10 so cut-out area 9 may be maintained in fixed position over solid portion 7 closing the dispensing container 1.

The compartment body 2 has a centrally located inset portion 13 on both its top and bottom sections, each said inset portion 13 having an arcuate opening 14 in its base.

Each cover 8 has a centrally located opening 15 which is positioned over inset portion 13. It is preferable that the circumferential portion of opening 15 have depending sides 16 to fit within inset 13.

Each cover is mounted on compartment body 2 by mounting lock 17 having a top section 18 with an area greater than opening 15 and a depending finger 19 of a length slightly greater than the combined width of cover 8, vertical height of inset 13 and opening 14. A transverse flange 20 is provided along the bottom of finger 17 adapted to fit within arcuate opening 14.

A spring 21 is positioned within inset 13 so as to provide an upward force on cover 8 and top 17. Once the transverse flange 20 is positioned through arcuate opening 14 it in twisted thereby locking cover 8 over compartment body 2.

Spring 21 may be pre-affixed to the underside of mounting lock top 18, the spring 21 being an integral unit of mounting lock 17.

Notches 22 may be provided to the underside of the base portion of inset 13, the upward force of spring 21 locking transverse flange 20 therein.

Cover 8 may be provided with fins 23 on its outer periphery, fins 23 being employable for ease of rotation of cover 8. The fins 23 additionally provide a platform for the dispensing container 1, the high point of the fins 23 bearing on the surface upon which the dispensing container 1 rests.

The cover 8 may be opaque as shown in FIG. 1 thereby only exposing the selected compartment 5 through cut-out area 9, or of a transparent material such as clear plastic or other similar material providing the user with a simple method of awareness of the contents of the trays 3, 4.

As shown in FIGS. 1–3, the cover 8 does not completely cover compartment body 2 but leaves the peripheral upper and lower edges 25, 26 of the cover body 2 exposed so that the indicia thereon (shown as the days of the week) are always exposed. The outer edge of the cover 8 rests upon a flanged portion 24 inward of the peripheral edges 25, 26 the cover 8 being inset on compartment body 2 in mounted position.

The blank area 6 shown in FIG. 3 can be employed as a storage area accessible through cut-out area 9 or as shown in FIG. 6, the outer side wall of compartment body 2 in the area of cut-out area 9 may be eliminated and a supplemental insert such as the travel pack 28 shown in FIGS. 6–9a may be insertable therein.

Travel pack 28 is shown as a compartmentalized independent section having compartments 29 similar to compartments 5 in trays 3, 4 and as shown contain indicia for the four main waking hours. It is to be understood that the size and number of compartments 29 can be varied for particular needs.

An independant cover 30 is provided for travel pack 28 pivotally affixed to travel pack 28 such as by a hinge 31. The cover 30 on the travel pack 28 may have pull tab 32 to aid in the opening of cover 30. A declivity 33 formed in outer wall 34 of travel pack 28 may be provided to receive a locking flange 35, locking flange 35 snap locking into declivity 33 to maintain cover 30 in closed position.

The outer wall 34 of travel pack 28 is of a slightly narrower configuration than outer wall 27 of compartment body 2 so that top 32 will not interfere with the rotation of cover 8.

Detents 39 depend from the underside of base 36 of travel pack 28 adapted to fit within declivities 37 in compartment body 2, thereby fixedly mounting travel pack 28 within compartment body 2.

If desired each compartment 5 of trays 3, 4 may be provided with an individual independant cover such as cover 30. A pair of declivities 38 provided on the top surface of each cover 30 spaced apart so as to mate with depending flanges 10 on cover 8 would provide a lock for cover 8 positioning cut-out area 9 of cover 8 over cover 30, the depending flanges 10 on cover 8 mating with declivities 38 on adjoining covers 30. Where individual covers 30 are provided, cut-out area 9 is of slightly wider configuration than compartment 5 so as not to interfere with the upward pivoting of cover 30.

As shown in FIGS. 10–12 in lieu of the integral trays 3, 4 a completely removeable tray 40 may be provided adapted to be lifted outward of the compartment body 2 upon removal of mounting lock 17. A key hole shaped opening 41 is provided in tray 40 so that tray 40 fits within compartment body 2, the flared portion of opening 41 fitting about solid portion 7 in compartment 2 locking tray 40. Cover 8 is then positioned over tray 40 by mounting lock 17 in a like manner as hereinbefore described.

FIG. 13 shows a tray 42 having a key hole shaped opening 43 of the same configuration as opening 41 in FIG. 10. A circumferential lip 44 is provided on tray 42 adapted to contain indicia such as the days of the week for a selected group of compartments 5. In this manner, a single compartment body 2 can be used with a variety of trays subdivided in differing time intervals. Where for example medication is first prescribed to be taken four times a day every day for one week and then 3 times a day once a week for two months trays can be provided pre-filled having the time interval indicia thereon, the trays interchangeable within compartment body 2.

Where trays 42 such as shown in FIG. 13 are employed, the outer side of tray 42 may be of a slightly greater height so that lip 44 will fit over the peripherial edge 25 of compartment 2.

A storage lid 45 may be provided for tray 40, as shown in FIG. 14 or tray 42, removeably mounted on tray 40 sealing the top of tray 40 against accidental spillage of its contents when stored. Since trays 40, 42 are interchangeable within compartment 2, they can be pre-filled by a user, his physician or by his druggist who pre-loads the trays according to the physician's instructions.

As shown in FIG. 14, storage lid 45 is of a similar shape as tray 40 and of a slightly greater circumference than tray 40 with depending portions 46 at pre-selected points along its outer periphery adapted to lock within insets 47 provided along the outer portion of side wall 48 of tray 40.

When tray 40 or 42 is desired to be inserted within compartment body 2, storage lid 45 is removed and tray 40, 42 is positioned within compartment body 2 and cover 8 affixed.

In operation, the compartments 5 are loaded with the desired medication. Where trays 40, 42 are employed, trays 40, 42 are inserted within compartment body 2. Cover 8 is positioned over the trays 3, 4, 40, 42 and affixed thereon by mounting lock 17.

Cut-out area 9 is preferably positioned over solid portion 7 the depending flanges 10 on cover 8 engaging declivities 12. When a determined time period has been reached, cover 8 is rotated by use of fins 23. Cover 8 is locked into position over a selected compartment 5, depending flanges 10 either abut the side walls 11 of compartments 5 or where the compartments 5 have covers 30 by mating with declivities 38 on adjoining covers 30.

The selected compartment is emptied and the cut-out area 9 of cover 8 may be returned to its position over solid portion 7 or allowed to remain over emptied compartment 5.

Where the travel pack 28 is employed, a slightly upward and outward force is applied to travel pack 28, tab 32 being readily employable for the application of such force, thereby removing detents 39 from declivities 37. The travel pack 28 being thereby removed, it is readily employable as a separate unit and the compartments 29 therein readily accessible by the lifting of cover 30.

To refill or replace the trays 3, 4, 40, 42 a downward pressure is applied to the top 18 of mounting lock 17, twisting top 18 until transverse flange 20 is positioned so that it will pass through arcuate opening 14 removing mounting lock 17.

It is to be understood that the dispensing container 1 of the present invention preferably includes a compartment body 2 adapted to include or accept trays on both top and bottom and that all both the top and bottom portions of the dispensing container 1 of the present invention are adapted to include trays and cover 8.

The terms and expressions which are employed are used as terms of description; it is recognized, though that various modifications are possible within the scope of the invention claimed.

Having thus described certain forms of the invention in some detail, what is claimed is:

1. A dispensing container comprising a compartment body having an upper portion and a lower portion, each said portion subdivided into substantially equal compartments of a general triangular configuration, a section of each of said portions slightly wider than but of substantially the same configuration as each said compartment, said wider section having a substantially flat top surface, a pair of declivities on said flat top surface, a centrally located inset portion having an opening in the base thereof on said upper and lower portions, a cover having a centrally located opening therein for each said upper and lower portions, a cut-out portion on said cover, said cut-out portion slightly narrower than, but of substantially the same configuration as each said compartment, a pair of depending flanges on the underside of each said cover along the peripheral area of said cut-out portion, said depending flanges adapted to mate with said declivities on said flat top surface, and cover mounting means, said cover mounting means including; a head portion on said cover mounting means having an area greater than said cover opening; a finger depending from said head portion of a length slightly greater than the combined width of said cover and vertical height of said centrally located inset portion and the opening in the base of said inset portion; a transverse flange on the lower portion of said finger adapted to fit within said inset base opening and spring means within said inset portion adapted to provide an upward force to said cover and said cover mounting means rotatably removably mounting said cover on said compartment body.

2. The invention of claim 1 wherein the opening in the base of said centrally located inset portion is arcuate, and said base of said centrally located inset portion further includes notches on the underside thereof, said transverse flange on said finger adapted to fit within said notches.

3. The invention of claim 1 wherein the top of said cover includes a plurality of fins, the upper edges of said fins extending above said head portion of said cover mounting means to provide a platform for the container.

4. The invention of claim 1 wherein said centrally located opening on said cover further includes a peripheral depending flange adapted to fit within said centrally located inset portion.

5. The invention of claim 1 wherein said depending flanges along the peripheral area of said cut-out portion are adapted to intersect the outer surface of the side wall of each said compartment maintaining said cut-out area in fixed position over said compartment.

6. The invention of claim 1 wherein the outer peripheral surface of said compartment body beyond said inset portion includes a flanged portion, the peripheral edge of said dispensing container cover adapted to fit over said flanged portion.

7. The invention of claim 1 wherein the outer top peripheral surface of said compartment body is adapted to receive informational indicia thereon.

8. The invention of claim 1 wherein said compartment subdivided inset portion further includes at least one larger compartment of substantially greater area than the other of said compartments.

9. The invention of claim 8 wherein the outer wall of said compartment body in the area of said larger compartment is broken away and said larger compartment is adapted to receive a removably mounted supplemental dispensing container therein.

10. The invention of claim 9 wherein the base of said larger compartment includes declivities and the base of said supplemental dispensing container includes depending detents adapted to fit within said declivities.

11. The invention of claim 9 wherein said supplemental compartment includes a cover pivotally mounted thereon.

12. The invention of claim 11 wherein said pivotally mounted cover on said supplemental compartment further includes a tab, said tab positioned on said cover so as to project upward from said cover beyond the periphery of said compartment body cover.

13. The invention of claim 1 wherein said each compartment further includes a pivotally hinged cover thereon and said cut-away portion of said dispensing container cover is widened so as to be slightly wider than each said compartment.

14. The invention of claim 13 wherein each said pivotally hinged cover includes declivities and the underside of said dispensing container cover substantially along the peripheral area of said cut-out portion includes depending flanges adapted to fit within declivities on two of said compartments maintaining said cut-out area in fixed position about a pivotally covered compartment.

15. A dispensing container having at least one removable tray comprising a body portion having at least one inset portion, a portion of said body portion extending inward of said inset portion towards the center of said inset portion, a pair of declivities on the top surface of said inward extending portion, a centrally located inset portion in said body portion formed within said inward extending portion, an opening in the base of said centrally located inset portion, a tray transversely sub-divided into substantially equal compartments adapted to fit within said inset portion, said tray having a peripheral shape of the same configuration as the peripheral shape of said inset portion and a cut-away portion of substantially the same configuration as said inward extending portion of said body portion, a cover for said body portion, a centrally located opening on said cover adapted to fit over said tray and inset portion, a cut-out portion on said cover, said cut-out portion being slightly narrower than but of substantially the same configuration as said inward extending portion, a pair of depending flanges on the underside of said cover along the peripheral area of said cutout portion and cover mounting means including; a head portion on said cover mounting means having an area greater than said cover opening; a finger depending from said head portion of a length slightly greater than the combined width of said cover and vertical height of said centrally located inset portion and the opening in the base of said inset portion; a transverse flange on the lower portion of said finger adapted to fit within said centrally located inset base opening and spring means within said inset portion adapted to provide an upward force to said cover and said cover mounting means, rotatably removeably mounting said cover on said body portion.

16. The invention of claim 15 wherein said body portion includes an upper and lower section with inset portions within each said upper and lower sections adapted to receive a tray therein and a rotatable removeable cover for each said tray.

17. The invention of claim 15 wherein said tray further includes a peripheral flange adapted to fit over the peripheral edge of said body portion.

18. The invention of claim 15 wherein the outer periphery of said body portion is circular and each said compartment in said tray is of a substantially triangular configuration.

19. The invention of claim 15 wherein said inward extending portion of said body portion and said cut-away portion of said tray are key-hole shaped.

20. The invention of claim 15 wherein said tray includes a storage lid, said storage lid removeable from said tray before said tray is inserted within said body portion.

21. The invention of claim 20 wherein said storage lid is slightly larger than but of the same configuration as the top of said tray, said storage lid including depending flanges along its peripheral edge, said tray including declivities on its side portions, said depending flanges adapted to butt fit within said declivities.

References Cited

UNITED STATES PATENTS

| | | | |
|---|---|---|---|
| 739,209 | 9/1903 | Ocumpaugh | 312—295 X |
| 1,140,142 | 5/1915 | Faile | 312—295 X |
| 2,351,815 | 6/1944 | Jensen | 312—295 X |
| 2,412,332 | 12/1946 | Hansen | 312—295 |
| 2,668,090 | 2/1954 | Derr | 312—295 X |
| 2,810,473 | 10/1957 | Oden et al. | 312—295 X |
| 2,814,904 | 12/1957 | Reedall. | |
| 2,828,005 | 3/1958 | Ricke | 206—42 |
| 2,832,659 | 4/1958 | Akers | 312—295 X |
| 2,953,242 | 9/1960 | Shaw | 206—42 |
| 3,288,277 | 11/1966 | Hallerbach | 206—42 |

FOREIGN PATENTS

| | | |
|---|---|---|
| 1,004,772 | 3/1957 | Germany. |

JOSEPH R. LECLAIR, *Primary Examiner.*

J. M. CASKIE, *Assistant Examiner.*